(12) United States Patent
Shelstad et al.

(10) Patent No.: US 11,467,035 B2
(45) Date of Patent: Oct. 11, 2022

(54) AUTOMATIC APPLICATION OF LOCAL SPECIFICATION

(71) Applicant: MOBA Mobile Automation AG, Limburg (DE)

(72) Inventors: David Shelstad, Peachtree City, GA (US); Paul Angerhofer, Peachtree City, GA (US)

(73) Assignee: MOBA MOBILE AUTOMATION AG, Limburg (DE)

( * ) Notice: Subject to any disclaimer, the term of this patent is extended or adjusted under 35 U.S.C. 154(b) by 504 days.

(21) Appl. No.: 16/694,015

(22) Filed: Nov. 25, 2019

(65) Prior Publication Data

US 2020/0173857 A1 Jun. 4, 2020

(30) Foreign Application Priority Data

Nov. 30, 2018 (EP) .................................... 18209504

(51) Int. Cl.
*G01J 5/02* (2022.01)
*E01C 19/48* (2006.01)
(Continued)

(52) U.S. Cl.
CPC .............. *G01J 5/025* (2013.01); *E01C 19/48* (2013.01); *E01C 23/01* (2013.01); *G06V 20/56* (2022.01); *H04N 5/33* (2013.01); *G01J 5/485* (2022.01)

(58) Field of Classification Search
None
See application file for complete search history.

(56) References Cited

U.S. PATENT DOCUMENTS 5,362,176 A * 11/1994 Sovik ..................... E01C 19/006
404/72
10,662,595 B2 * 5/2020 Buschmann ............ E01C 19/08
(Continued)

FOREIGN PATENT DOCUMENTS

| GN | 102691251 A | 9/2012 | |
|---|---|---|---|
| JP | 2016102396 A * | 6/2016 | ............. E01C 19/48 |
| WO | 00/70150 A1 | 11/2000 | |

OTHER PUBLICATIONS

S.R. Miller, T. Hartmann, A.G. Dorée, Measuring and visualizing hot mix asphalt concrete paving operations, Automation in Construction, vol. 20, Issue 4, (Year: 2011).*

(Continued)

*Primary Examiner* — Stefan Gadomski
(74) *Attorney, Agent, or Firm* — Keating & Bennett, LLP

(57) ABSTRACT

A control unit of a temperature measurement system for a road construction machine; the control unit having access to a database, a plurality of specification data sets stored on the database, each of the plurality of specification data sets being assigned to a local region and including a temperature measurement specification and/or a temperature measurement report specification; including a data set selector and a data analyzer. The data set selector is configured to select a respective specification data set from the plurality based on position information for the road construction machine, the position information pointing to the respective local region. The data analyzer is connected to a temperature sensor and configured to analyze raw data received from the temperature sensor taking into account the selected temperature measurement specification and/or to output a local specific temperature report based on analyzed raw data taking into account the selected temperature measurement report specification.

17 Claims, 8 Drawing Sheets

(51) Int. Cl.
*E01C 23/01* (2006.01)
*H04N 5/33* (2006.01)
*G06V 20/56* (2022.01)
*G01J 5/48* (2022.01)

(56) References Cited

U.S. PATENT DOCUMENTS

| | | | |
|---|---|---|---|
| 2008/0208417 A1* | 8/2008 | Buehlmann | E01C 19/006 701/50 |
| 2012/0263531 A1* | 10/2012 | Rutz | E01C 19/00 404/102 |
| 2013/0322964 A1* | 12/2013 | Buschmann | E01C 19/4866 404/75 |
| 2014/0308073 A1 | 10/2014 | Delius | |
| 2016/0042235 A1* | 2/2016 | Buschmann | G01J 5/0859 348/148 |
| 2016/0061755 A1* | 3/2016 | Delius | E01C 19/48 374/43 |
| 2016/0281304 A1 | 9/2016 | Rutz et al. | |
| 2017/0169625 A1* | 6/2017 | Lavie | G08G 1/0141 |
| 2019/0078270 A1* | 3/2019 | Laugwitz | E01C 19/004 |

OTHER PUBLICATIONS

Emad Kassem, Wenting Liu, Tom Scullion, Eyad Masad, Arif Chowdhury, Development of compaction monitoring system for asphalt pavements, Construction and Building Materials, vol. 96 (Year: 2015).*

L. Chapman, J.E. Thornes, A geomatics-based road surface temperature prediction model, Science of the Total Environment, vol. 360, Issues 1-3, (Year: 2006).*

A. A. Oloufa, "Quality control of asphalt compaction using GPS-based system architecture," in IEEE Robotics & Automation Magazine, vol. 9, No. 1, pp. 29-35, Mar. 2002, doi: 10.1109/100.993152. (Year: 2002).*

Bijleveld, F & Vasenev, Alexandr & Hartmann, Timo & Dorée, André. (2014). Real-time and post processing of GPS data in the field of visualizing asphalt paving operations. EG-ICE 2011, European Group for Intelligent Computing in Engineering. (Year: 2011).*

* cited by examiner

| Specification File | | | 100 |
|---|---|---|---|
| A | temperature measuring device settings | | |
| A 1 | apparatus type | handheld camera | |
| A 2.1 | measuring range from | 40 °F | |
| A 2.2 | measuring range to | 475 °F | |
| A 3.1 | accuracy absolute | +/- 4.0 °F | |
| A 3.2 | accuracy relative | +/- 2.0 °F | |
| A 4 | image resolution | 19,200 pixels | |
| A 5.1 | displaying min. temperature | yes | |
| A 5.2 | displaying max. temperature | yes | |
| A 6 | thermal sensitivity | <0.15 °F | |
| A 7.1 | variable emissivity from | 0.1 | |
| A 7.2 | variable emissivity to | 1.0 | |
| A 8 | ... | | |
| B | temperature measuring device settings | | |
| B 1 | apparatus type | paver-mounted | |
| B 2 | maximum transverse spacing | 12 +/- 1 inch | |
| B 3.1 | measuring range from | 40 °F | |
| B 3.2 | measuring range to | 475 °F | |
| B 4.1 | accuracy absolute | +/- 3.5 °F | |
| B 4.2 | accuracy relative | +/- 1.5 °F | |
| B 5.1 | repeatability absolute | +/- 1.8 °F | |
| B 5.2 | repeatability relative | +/- 0.75 % | |
| B 6 | profiling pavement width | 12 feet | |
| B 7 | ... | | |
| C | basic settings | | |
| C 1 | units of degrees | Fahrenheit | |
| C 2 | maximum paver stop time | 60 seconds | |
| C 3 | exclude area if paver stops more than <C2> | | |
| C 3.1 | behind last measurement | 2 feet | |
| C 3.2 | in front of last measurement | 8 feet | |
| C 4 | ... | | |
| D | measuring procedure | | |
| D 1 | if apparatus type = "handheld camera": | | |
| D 1.1 | [display advice]: "step 1: mark the pavement adge at the beginning and ending location of each thermal profile using spray paint or a permanent marker." | | |
| D 1.2 | [display advice and figure]: "refer to the following figure:" | | |

<continuation see Figure 3b>

Fig. 3a

Thermal Profile Summary Report 210

| Profile ID: | 43 NB | Profile Date: | 9/13/2017 5:39:48 AM |
|---|---|---|---|
| Profile Number: | | Letting Date: | |
| Status: | | Controlling CSJ: | |
| County: | | Spec Year: | |
| Tested by: | | Spec Item: | |
| Test Location: | | Special Provision: | |
| Material Code: | | Mix Type: | |
| Material Name: | | | |
| Producer: | | | |
| Area Engineer: | | Project Manager: | |

| Course/Lift: | 2 | Temperature Differential Threshold: | 25.0 |
|---|---|---|---|
| Segment Length (ft): | 150 | Sensors Ignored: | - |

Thermal Profile Results Summary 220

| Number of Profiles | Moderate 25.0°F < differential <= 50.0°F | | Severe differential > 50.0°F | |
|---|---|---|---|---|
| | Number | Percent | Number | Percent |
| 67 | 5 | 7 | 0 | 0 |

Summary of Locations with Thermal Segregation 230

| Profile Nr | Beginning Location | | Ending Location | | Max Temp | Min Temp | Temperature Differential |
|---|---|---|---|---|---|---|---|
| | Station | GPS in ° | Station | GPS in ° | | | |
| 1 | 2906.93 | 87.864719 W 44.37617900 N | 2908.43 | 87.864998 W 44.37657300 N | 322.2 | 286.2 | 36.0 |
| 6 | 2914.43 | 87.86612 W 44.37815700 N | 2915.93 | 87.8664 W 44.37855300 N | 302.5 | 275.9 | 26.6 |
| 12 | 2923.44 | 87.867811 W 44.38054800 N | 2924.92 | 87.868096 W 44.38094100 N | 302.2 | 274.3 | 27.9 |
| 14 | 2926.44 | 87.868389 W 44.38134200 N | 2927.92 | 87.868678 W 44.38173200 N | 306.3 | 278.8 | 27.5 |
| 23 | 2939.93 | 87.871115 W 44.38485700 N | 2941.43 | 87.871432 W 44.38524100 N | 313.3 | 285.3 | 28.1 |

<continuation see Figure 4b>

Fig. 4a

<continuation of Figure 4a>

240

Summary of Locations Without Thermal Segregation

| Profile Nr | Beginning Location | | Ending Location | | Max Temp | Min Temp | Temperature Differential |
|---|---|---|---|---|---|---|---|
| | Station | GPS in ° | Station | GPS in ° | | | |
| 2 | 2908.44 | 87.865 W 44.37657600 N | 2909.92 | 87.865277 W 44.37696500 N | 308.7 | 290.8 | 17.8 |
| 3 | 2909.93 | 87.865278 W 44.37696700 N | 2911.43 | 87.86558 W 44.37736100 N | 305.1 | 281.8 | 23.2 |
| 4 | 2911.44 | 87.86556 W 44.37736400 N | 2912.92 | 87.865837 W 44.37775800 N | 305.4 | 284.5 | 20.9 |
| 5 | 2912.93 | 87.865839 W 44.37776000 N | 2914.42 | 87.866118 W 44.37815400 N | 301.6 | 286.7 | 14.9 |
| ⋮ | ⋮ | ⋮ | ⋮ | ⋮ | ⋮ | ⋮ | ⋮ |
| 66 | 3004.43 | 87.884922 W 44.40130800 N | 3005.93 | 87.885241 W 44.40168800 N | 308.3 | 291.6 | 16.7 |
| 67 | 3005.94 | 87.885242 W 44.40168900 N | 3007.42 | 87.885559 W 44.40206900 N | 304.7 | 286.5 | 18.2 |

250

Distribution of Placement Temperatures

Mean: 301 °F
Median: 303 °F
σ: 6.76 °F

251

AUTOMATIC APPLICATION OF LOCAL SPECIFICATION

CROSS REFERENCE TO RELATED APPLICATIONS

This application claims the benefit of priority to European Patent Application No. EP 18 209 504.2 filed on Nov. 30, 2018. The entire contents of this application are hereby incorporated herein by reference.

Embodiments of the present invention refer to a control unit of a temperature measurement system and a corresponding method. In general, embodiments of the present invention relate to the field of mobile road construction machines, in particular to a system for determining and monitoring the temperature of a road building material, such as asphalt, bitumen, asphalt blend material or the like, newly applied by a construction machine. Furthermore, the present invention relates to a construction machine comprising such a system.

BACKGROUND OF THE INVENTION

With road building projects, such as building a new road or renewing damaged road surfaces, the quality of the newly applied road building material is to be documented by the executing companies using check tests. Measuring the temperature of the asphalt layer directly after being mounted by the road finishing machine is among these tests. The temperature of the newly applied road building material is measured over the entire placement width directly behind the asphalt plank of the road finishing machine.

Conventional technology provides a plurality of temperature measurement concepts, as will be discussed further below:

A roadway temperature monitoring system comprising a temperature sensor is known from WO 00/70150 A1. The temperature sensor is arranged at the back end of a road finishing machine such that the entire width of the newly applied asphalt layer is scanned. The captured temperature values may be displayed graphically on a display device.

The US 2016/0281304 A1 describes a road finishing machine with a thermographic device releasably fixed to a portion of the machine for recording a georeferenced thermographic data record of at least one region of a pavement layer. The thermographic device includes a housing in which a detection unit for detecting a thermographic data record and a further detection unit for detecting a space-related data record for the thermographic data record are disposed.

Furthermore, the CN 102691251 A describes a paver asphalt temperature segregation infrared detection system and a detection method. The system comprises an electric subsystem and a data analysis subsystem, whereby the data analysis subsystem is used for consulting the data detected by the electric subsystem and analyzing the paving quality of the asphalt pavement to obtain a complete detection result of the entire paved road. Real-time monitoring of the interior of the asphalt pavement can be performed during pavement paving.

Often, the requirements for the temperature measurement are given by the client, e.g. the respective country or state. The above-mentioned conventional systems could not easily handle the different requirements. Therefore, there is a need for an improved approach.

SUMMARY

An embodiment may have a control unit of a temperature measurement system for a road construction machine; wherein the control unit has access to a database, a plurality of specification data sets stored on said database, wherein each of the plurality of specification data sets is assigned to a local region and includes a temperature measurement specification and/or a temperature measurement report specification; the control unit includes a data set selector, which is configured to select a respective specification data set out of a plurality based on a position information for the road construction machine, the position information pointing to the respective local region; and a data analyzer, which is connected to a temperature sensor and configured to analyze raw data received from the temperature sensor taking into account the selected temperature measurement specification and/or to output a local specific temperature report based on the analyzed raw data taking into account the selected temperature measurement report specification.

Another embodiment may have a temperature measurement system including an inventive control unit and a temperature sensor or temperature scanner as temperature sensor or temperature camera as temperature sensor; or including an inventive control unit, a position sensor and a temperature sensor or temperature scanner as temperature sensor or temperature camera as temperature sensor.

According to another embodiment a road construction machine, especially a road paver, may have; an inventive control unit or a temperature measurement system including an inventive control unit and a temperature sensor or temperature scanner as temperature sensor or temperature camera as temperature sensor; or including an inventive control unit, a position sensor and a temperature sensor or temperature scanner as temperature sensor or temperature camera as temperature sensor.

According to another embodiment a method for operating a temperature measurement system for a road construction machine, may have the steps of: getting access to a database, a plurality of specification data sets stored on said database, wherein each of the plurality of specification data sets is assigned to a local region and includes a temperature measurement specification and/or a temperature measurement report specification; selecting a respective specification data set out of a plurality based on a position information for the road construction machine, the position information pointing to the respective local region; receiving raw data from a temperature sensor; and analyzing the raw data taking into account the selected temperature measurement specification and/or outputting a local specific temperature report based on the analyzed raw data taking into account the selected temperature measurement report specification.

Another embodiment may have a non-transitory digital storage medium having a computer program stored thereon to perform the method for operating a temperature measurement system for a road construction machine, the method having the steps of: getting access to a database, a plurality of specification data sets stored on said database, wherein each of the plurality of specification data sets is assigned to a local region and includes a temperature measurement specification and/or a temperature measurement report specification; selecting a respective specification data set out of a plurality based on a position information for the road construction machine, the position information pointing to the respective local region; receiving raw data from a temperature sensor; and analyzing the raw data taking into account the selected temperature measurement specification and/or outputting a local specific temperature report based on the analyzed raw data taking into account the selected temperature measurement report specification; when said computer program is run by a computer.

An embodiment of the present invention provides a control unit of a temperature measurement system for a road construction machine, e.g. a paver. The control unit comprises at least two entities, namely a data selector and an analyzer. Furthermore, the control unit has access or comprises a database storing a plurality of specification data sets. Each of the plurality of specification data sets is assigned to a local region, e.g. a country or a state and comprises a temperature measurement specification and/or a temperature measurement report specification. The data selector is configured to select a respective specification data set out of the plurality based on the position information for the road construction machine. The position information points to a respective local region. Note that according to embodiments, the position information may be obtained using a position sensor (e.g. GPS or GNSS), which may belong to the construction machine or to the temperature measurement system, so that the correct data can be selected automatically. The data analyzer is connected to a temperature sensor (which may be part of the temperature measurement system and, for example, implemented as a temperature scanner or a temperature camera) so as to receive raw data from the temperature sensor. The data analyzer is configured to analyze the raw data taking into account the selected temperature measurement specification and/or to output a local specific temperature report based on the analyzes or raw data taking into account the temperature measurement report specification.

Embodiments of the present invention are based on the principle that dependent on the country or state in which the asphalt paver is used, different temperature specifications are available. These specifications may refer to the content of the reports or may include various calculations, e.g. of the average temperatures. Even if the calculation methods and the reports may differ from country to country or state to state, the methods for obtaining the raw data are the same. Starting from this finding, the typical system for determining and monitoring the temperature of the road construction material can be enhanced such that the control unit takes the different temperature measurement specifications into account. These temperature specifications are stored using a database within a so-called specification data sets, e.g. XML files. These data sets are read out by the control unit, which performs the analysis and the preparation of the temperature reports. In order to enable the control unit to select the right data set (automatically), it uses a (typically available) position information, since the plurality of specification data sets can be assigned to a local region and stored in an assigned manner within the database. Thus, the use of the position information of the asphalt paver (for example GPS information) enables advantageously to determine the correct specification and to automatically select the correct specification based on actual location. Consequently, the main advantage of the invention is that the correct specification will be selected automatically without the help of the operator.

According to an embodiment, the control unit is connected to or comprises a position sensor. This can advantageously output the position information so that the control unit can automatically select the correct temperature measurement data set. Alternatively, the position information may be manually selected by use of a user interface, e.g. by the operator.

According to embodiments, the database is stored on a server so that the plurality of specification data sets can be updated or when the control unit is configured to update the database (which may, according to embodiments, be stored on the memory of the control unit) so as to ensure that the plurality of specification data sets is up to date. In another advantageous manner new or updated specifications can be downloaded via wireless communication link (internet connection) from a dedicated server system. Therefore, the asphalt paver (or road finishing machine) has a wireless communication interface unit electrically connected to the operating and monitoring unit. The system or the operator can initiate such a download/update.

According to embodiments, the respective specification data set comprising information regarding temperature measurement device settings, regarding allowed temperature device settings, regarding basic settings, regarding a measurement procedure, regarding a measurement procedure dependent on the temperature measurement device, regarding a calculation, regarding a calculation dependent on a temperature measurement device, regarding a report content and/or regarding a report form. Due to these variables, the report for the client (for government or ministry) can be generated from raw data of a temperature sensor, wherein the content that may be used in these reports is also based on national or state-specific (country-specific) specifications and include, for examples, various calculations of average temperatures or different statistical data. Background thereof is that more and more states are adopting temperature specifications for paving and in practice each state has slightly different requirements, penalties and rewards, and reports (for example Minnesota or Texas in the US). It is conceivable that adjacent states will have different specifications. Currently all the specifications are stored within the control unit or the operating and monitoring unit of the temperature measuring system and an operator manually selects the correct specification for the post processing report.

In the following, different possibilities of how the selected specification data set influences the analyzation and/or the local specific temperature report will be discussed:

According to embodiments, the data analyzer is configured to perform a temperature calculation applied to the raw data, wherein the temperature calculation depends on the selected temperature measurement report specification to obtain the local specific temperature report. According to embodiments, the data analyzer calculates the temperature average/median volume, wherein the calculation is defined within the selected temperature measurement report specification so as to obtain local specifically calculated average/median temperatures for the local specific temperature report.

According to further embodiments, the control unit controls the data analyzer, temperature sensor and/or outputs information to the operator so as to apply local specific measurement procedures defined by the selected temperature measurement specification.

According to embodiments, the data analyzer is configured to output the local specific temperature report, which comprises local specific content defined by the selected temperature measurement report specification or has a local specific form defined by the selected temperature measurement report specification.

According to further embodiments, the data analyzer is configured to take into account local specific temperature requirements which are defined within the selected temperature measurement specification.

According to a further embodiment, the control unit comprises different kinds of memories. A first memory may be used for storing the database. Alternatively, this database can be located on a server so that the control unit comprises a communication unit for connecting to the server. According to an embodiment, in an advantageous manner the specification is a digital (electronic) file, for example a computer-readable XML file or the like. Such digital specification file can be read or interpreted by the temperature measurement system, without the help of the machine operator or the paving crew. According to a further embodiment, another memory, namely a measurement memory may be integrated into the control unit. The data analyzer uses this memory to store the raw data and/or local specific temperature report, e.g. together with a respective position information.

According to a further embodiment, the control unit may be connected to a further sensor, like a weather sensor, so that the data analyzer can take the weather information into account.

According to a further embodiment, the control unit comprises a user interface outputting information to an operator and/or is connected to an operation/monitoring system of the road construction machine in order to output information to the operator. Additionally, it is helpful for the machine operator or the paving crew to have the specification in a readable form similar to a machine operating manual, for example in a PDF format or the like. The machine operator or the paving crew can read the requirements and needs for the current construction site easily.

A further embodiment provides a temperature measurement system comprising a control unit as discussed above and a temperature sensor, e.g. a temperature scanner or temperature camera. It should be noted that it is the same for all four systems determining and monitoring the temperature of a road building material that the raw data recorded by a temperature sensor, for example a temperature scanner or temperature camera, serve as the basis for all further calculations and representations. That is, there are no differences on the part of the temperature sensor regarding the measured temperature data. Additionally, the system may comprise a position sensor for outputting the position information. A further embodiment provides a road construction machine, like a road paver comprising the control unit or the temperature measurement system as discussed above. Background of this application is that asphalt pavers (or road finishing machines) having such a system for determining and monitoring the temperature of a road construction material may typically use a so-called temperature specification that contains all relevant data, information and requirements for the temperature measurement system.

A further embodiment provides a method comprising the following steps:
  getting access to a database, a plurality of specification data sets stored on said database, wherein each of the plurality of specification data sets is assigned to a local region and comprises a temperature measurement specification and/or a temperature measurement report specification;
  selecting a respective specification data set out of a plurality based on a position information for the road construction machine, the position information pointing to the respective local region;
  receiving raw data from a temperature sensor; and
  analyzing the raw data taking into account the selected temperature measurement specification and/or outputting a local specific temperature report based on the analyzed raw data taking into account the selected temperature measurement report specification.

A further embodiment provides a computer program for performing the method.

BRIEF DESCRIPTION OF THE DRAWINGS

Embodiments of the present invention will be detailed subsequently referring to the appended drawings, in which:
FIGS. 3a-3c illustrate a specification file used as temperature measurement data set (!) according to embodiments;
and
  FIGS. 4a, 4b show an exemplary temperature measurement report according to an embodiment.

DETAILED DESCRIPTION OF THE INVENTION

Figure 1:
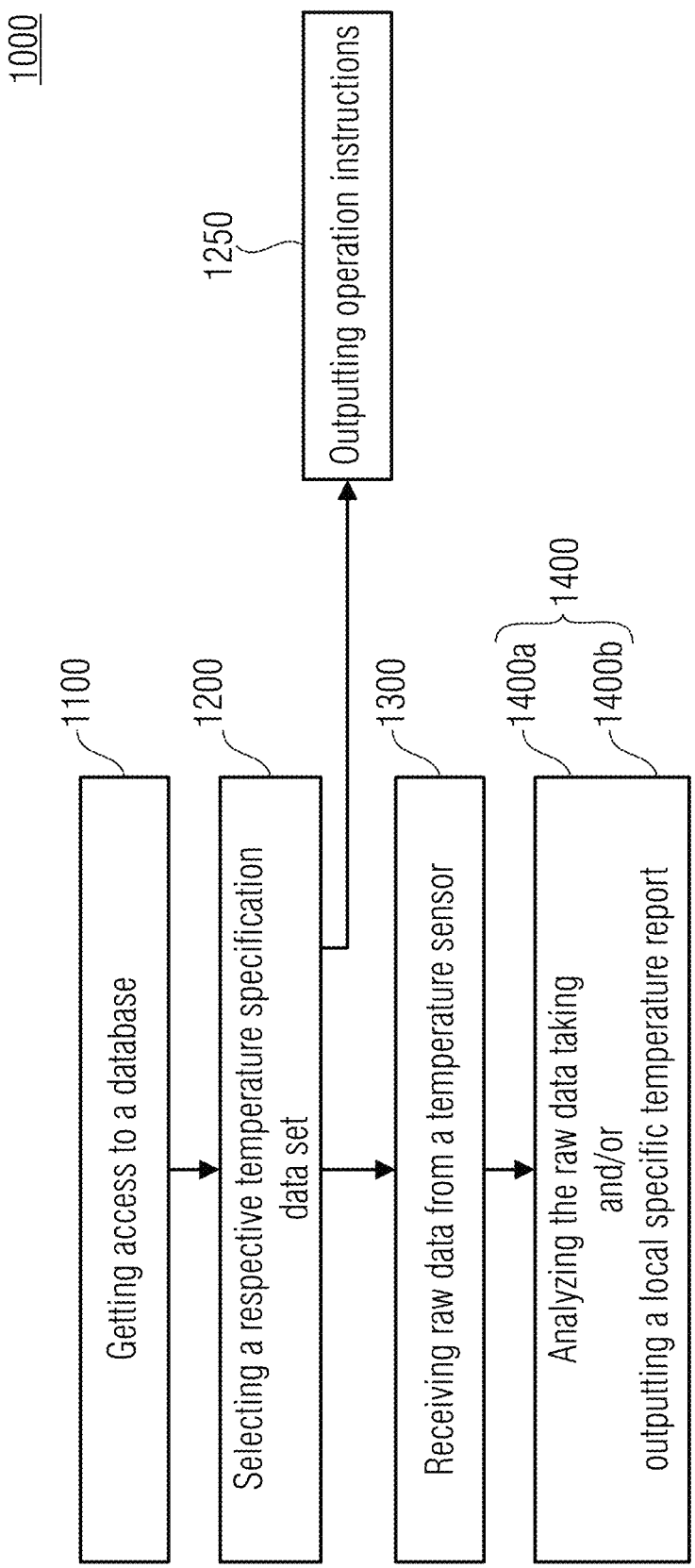
FIG. 1 shows a flowchart illustrating a method for operating a temperature measurement system according to a basic embodiment.

Below, embodiments of the present invention will subsequently be discussed referring to the figures, wherein identical reference numerals are provided to objects having similar or identical function, so that the description thereof is mutually applicable and interchangeable.

FIG. 1 shows a method 1000 for operating a temperature measurement system.

Figure 2A:
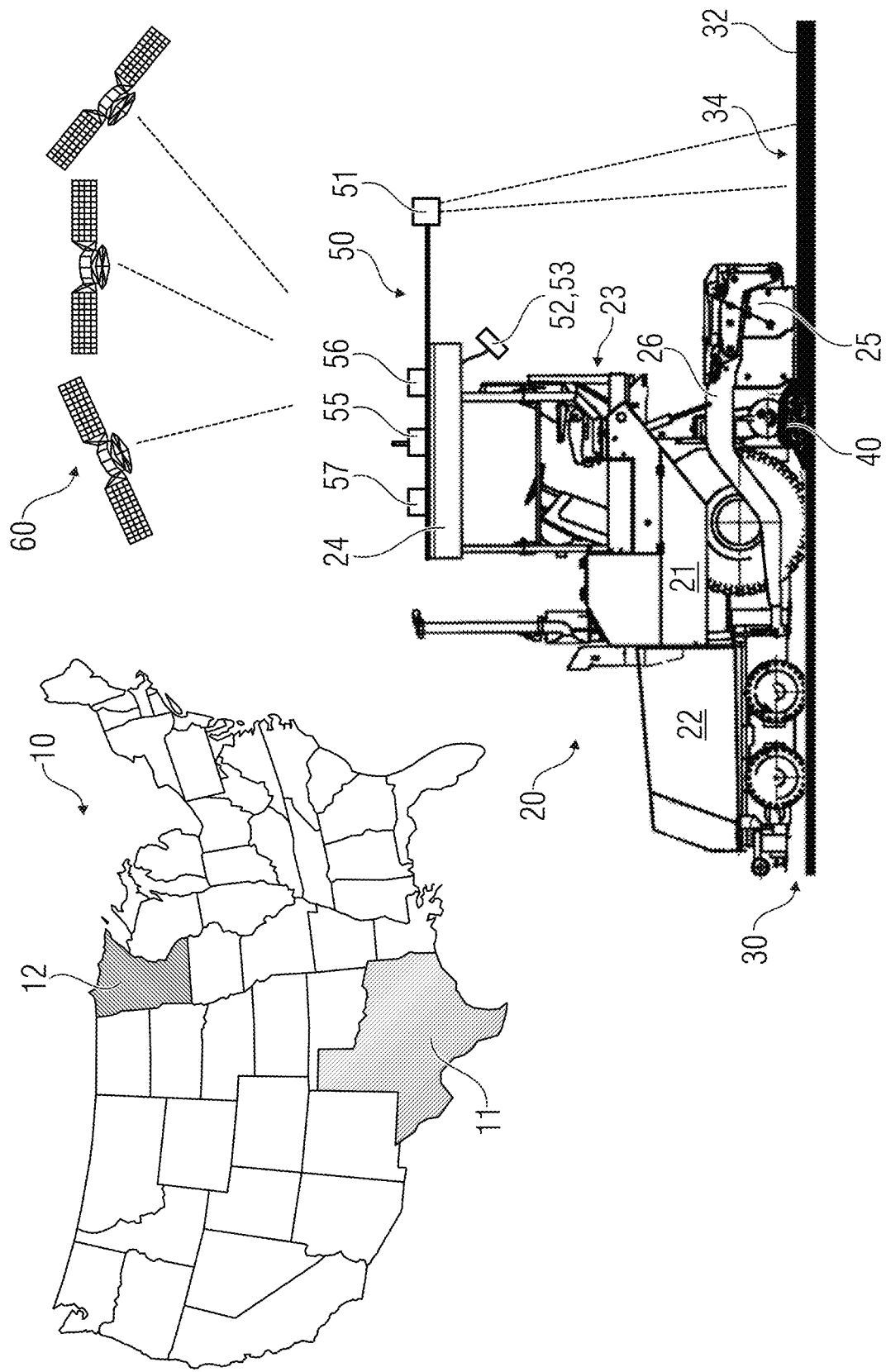
FIG. 2a shows a schematic illustration of a paver having a conventional temperature measurement system.
Figure 2B:
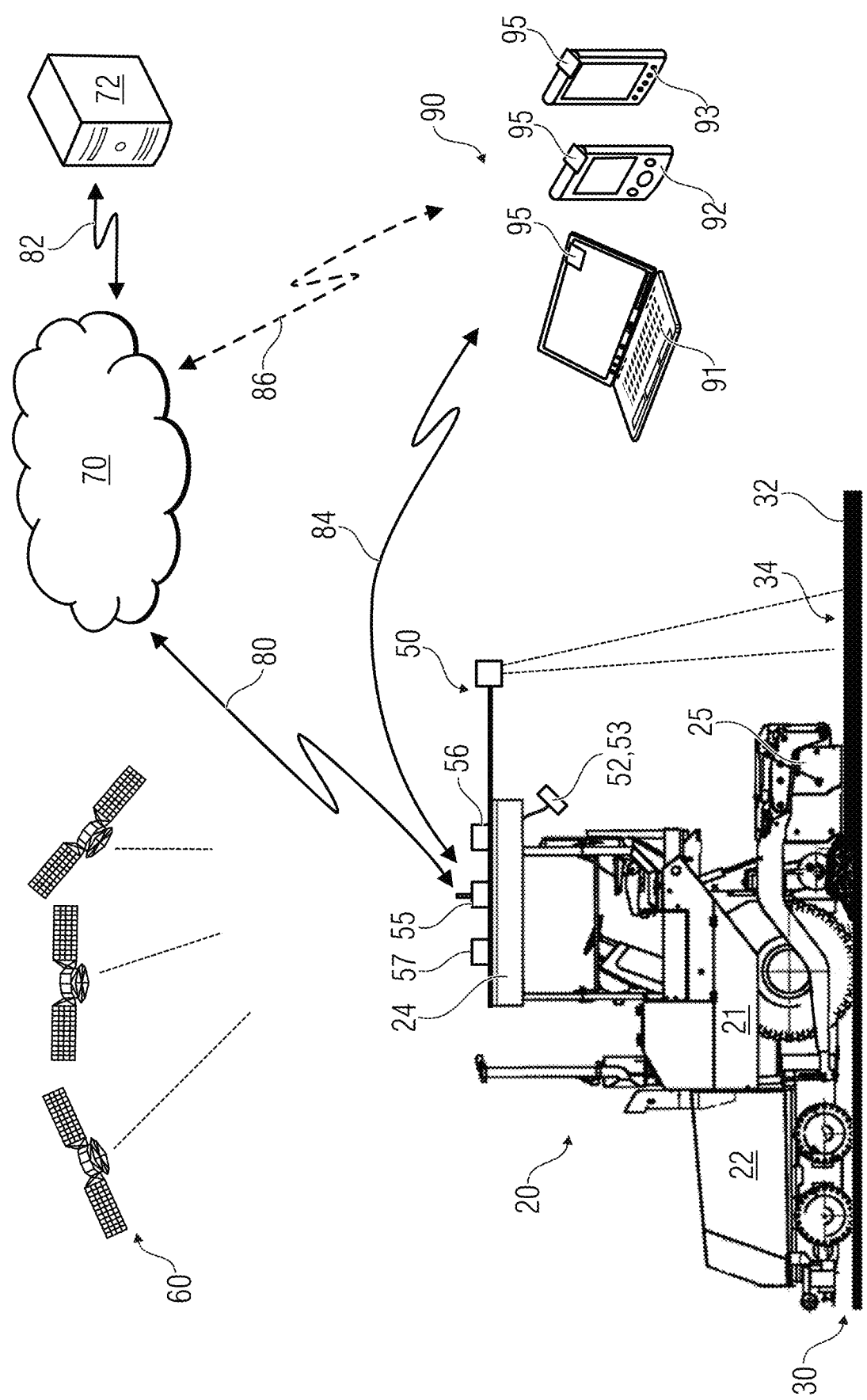
FIG. 2b shows a schematic illustration of a paver having a temperature measurement system according to an embodiment.

The temperature measurement system comprises, as illustrated by FIG. 2b, at least a temperature measuring control unit 53, which is connected to position detection unit 56 and a temperature measuring device 51. According to embodiments, the control unit has access to a database, which is exemplarily illustrated by the server 72. Starting from the above-mentioned hardware, the method 1000 for operating the temperature measurement system is performed using the four basic steps 1100, 1200, 1300 and 1400.

Within the first basic step 1100, the control unit accesses a database, e.g. a database which is stored on a server (cf. server 72) or database which is stored on an internal memory or to a database which is stored on a mobile memory like a USB device. For this step 1100, the control unit typically uses an interface, e.g. an air interface or an internal interface. The step 1100 has the purpose to download at least one specification data set of the plurality of specification data sets. Each of the data sets is assigned to specific regions, e.g. to a state.

In order to ensure that the read data set is chosen, the control unit uses a position information pointing to one of the regions of the data sets. This is illustrated by the step 1200. According to embodiments, the position information may be generated using a position sensor, e.g. a GPS sensor or GNSS sensor, which is typically present on the construction machine. Note that the order of the steps 1100 and 1200 may be in a manner as illustrated, namely to download the database and to select one data set of the database, or using a different order, namely that the control unit accesses the database with the knowledge of the recent position so as to select and download the correct data set from the database.

The data set may, for example, be stored as an XML file and comprises local specific information/parameters for performing and/or analyzing the temperature measurement. For example, the temperature measurement data set may comprise different temperature specifications, like a target temperature of the paving or a target temperature of the paving depending on the environmental conditions or parameters regarding the measurement, e.g. regarding the temperature measurement pattern according to which the different temperature values of the pavement are taken.

Furthermore, the temperature measurement data set may comprise information regarding the temperature measurement procedure, e.g. information which has to be provided to the operator, so that he can adjust the temperature measurement sensor, e.g. its alignment, correctly. This optional step of outputting operation instructions is marked by the reference numeral 1250. Additionally, the temperature measurement data set may comprise information how to calculate temperature measurement values for the temperature measurement report. For example, the calculation procedure for calculating an average value or mean temperature value may vary from region to region, e.g. dependent on the number of temperature values which have to be taken into account or dependent on differently defined standard variations. The temperature measurement data set furthermore comprises information how the temperature measurement report for the respective region has to be given. For example, the temperature measurement reports may differ with regard to its content and/or form.

All or some of the above-discussed temperature measurement specifications/parameters are taken into account during the measurement and the analysis. The temperature measurement or especially the receiving of the temperature raw data is illustrated by the step 1300 of receiving raw data from a temperature measurement sensor (e.g. an infrared camera). Within the step 1400, these raw data are processed so as to perform an analysis which is dependent on the specification given by the temperature measurement data set. The aim of this analysis is to obtain a temperature measurement report taking into account the local specific specifications. This additional or alternative sub-step is also included in the step 1400. From another point of view, this means that the step 1400 may comprise two sub-steps, which may be performed alternatively or additionally, of analyzing the raw data (cf. step 1400*a*) and outputting a local specific temperature report (cf. step 1400*b*). Both steps are dependent on the selected temperature measurement data set or the included specification.

Below, embodiments of the present invention will be discussed in detail referring to FIGS. 2*a* and 2*b*. FIG. 2*a* illustrates a conventional temperature measurement system, while FIG. 2*b* illustrated the enhancement of the temperature measurement system according to embodiments of the present invention. With regard to FIG. 2*a*, the motivation for using the position information to select the correct temperature measurement specifications will be discussed in more detail.

FIG. 2*a* shows a road finishing machine 20 illustrated in side view, comprising a chassis 21, a material bunker 22, a control platform 23 with a roof 24 which is supported by a frame of the control platform 23 and a screed 25, which is movable attached to the machine chassis 21 via tow arms 26. During the paving drive, the road finishing machine 20 moves on the underground to be asphalted 30, whereby paving material 40 is transported from the material bunker 22 via a non-depicted conveyor device underneath the control platform 23 through the chassis 21 of the road finishing machine 20 to the rear to the screed 25 by which it is processed into a new pavement layer 32. To measure the temperature of the new pavement layer 32 during the pavement operation, a temperature measuring device 51 is arranged with a bracket on the roof 24 of the control platform 23 at the back end of the road finishing machine 20. The temperature measuring device 51 can for example be a temperature scanner (movable infrared temperature sensor) or a thermal-imaging camera, for instance a thermal-imaging camera operating in a "line scan" mode. The temperature measuring device 51 captures the temperature of a region 34 which is located on the newly laid pavement layer 32 behind the screed 25.

The temperature measuring device 51 is part of a temperature measurement and monitoring system 50 of the road finishing machine 20. The system 50 comprises furthermore an operating and monitoring unit 52 and a control unit 53, both are releasable assembled in the back area of the road finishing machine 20. The control unit 53 is the central processing unit of the temperature measurement and monitoring system 50 and comprises at least a microcontroller and one or more memory units (RAM, ROM, Flash . . . ). The operating and monitoring unit 52 comprises input elements such as buttons and keys, and also at least one output element, for example a display. The operating and monitoring unit 52 forms the interface between the operator and the temperature measurement and monitoring system 50. In an advantageous manner, the operating and monitoring unit 52 and the control unit 53 are combined within one device, for example, a mobile computer suitable for construction machinery. A wireless communication interface unit 55, a position detection unit 56 and a weather station 57 are furthermore part of the temperature measurement and monitoring system 50 and all are releasable attached to the roof 24 of the road finishing machine 20. The control unit 53 is electrically connected to the temperature measuring device 51 and to the operating and monitoring unit 52. The temperature measuring device 51 transmits the determined measuring values to the control unit 53 which, in turn, sends same to the operating and monitoring unit 52 for displaying the measured temperature values.

The control unit 53 is also electrically connected to the wireless communication interface unit 55 and to the position detection unit 56. Via the wireless communication interface unit 55 the temperature measurement and monitoring system 50 is able to transmit and to receive data via a wireless communication technology, for example via Bluetooth or WLAN or other kind of known wireless communication technology. Therefore, the wireless communication interface unit 55 has an antenna arrangement to send and receive wireless data.

A positionally accurate georeferencing of the measured temperature values is in particular possible with the position detection unit 56 which is for example a Global Positioning System (GPS) receiver. The position detection unit 56 receives signals from a Global Navigation Satellite System (GNSS) 60 during the pavement operation of the road finishing machine 20 and sends same to the control unit 53.

The control unit 53 is furthermore electrically connected to the weather station 57 arranged at the road finishing machine 20 which exemplarily determines the wind speed, ambient temperature, air humidity, rainfall and/or other ambient parameters in the area of the road finishing machine 20. Thus, the weather station 57 transmits the determined measuring values to the control unit 53 which, in turn, uses or stores same for further calculations, exemplarily calculating the core temperature of the newly applied road building material 40.

All components 51, 52, 53, 55, 56 and 57 of the temperature measurement and monitoring system 50 can communicate with each other for example via CAN- or LIN-Bus or other kind of known communication bus systems used in mobile machines.

Figure 3B:
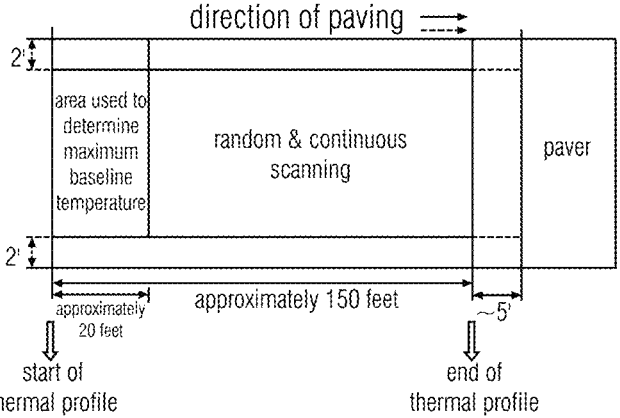
Figure 3C:
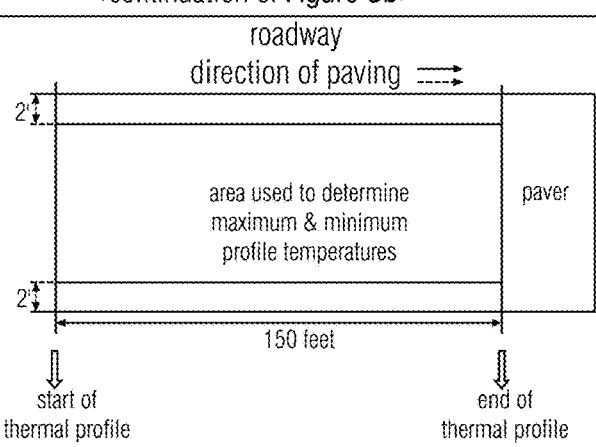

Combining the position data received from the position detection unit 56 with a map 10, it is possible to assign the road finishing machine 20 according to a country, state or federal state. FIG. 1 shows as an example the map 10 of the USA, whereby the states of Texas 11 and Minnesota 12 are marked. Depending on the country or state 11, 12 the road finishing machine 20 is used, different temperature specifications (FIGS. 3a to 3c show an example of a computer-readable specification file 100) are available. Reports for the client (for example government or ministry) may be generated from the raw data of the temperature measuring device 51 and the content that may be used in these reports are also based on national or state-specific (country-specific) specifications (for example specification from the Minnesota Department of Transportation (MnDOT) or the Texas Department of Transportation (TxDOT)) and include, for example, various calculations of average temperatures or different statistical data.

FIG. 2b shows the road finishing machine 20 according to FIG. 2a, comprising the temperature measurement and monitoring system 50 as well as the other components 51, 52, 53, 55, 56 and 57 as described above.

Via the wireless communication interface unit 55, the road finishing machine 20 and in particular the temperature measurement and monitoring system 50 is able to set up a communication to one or more data servers 72 far away. To transfer and exchange data between the temperature measurement and monitoring system 50 and the one or more data servers 72, the control unit 53 is able to set up and enable a communication link 80, 82 to the one or more data servers 72 via the wireless communication interface unit 55 and via a network 70, for example via a GSM network or an internet connection.

Dependent on the position data, the control unit 53 is then able to download a specification file 100 from the one or more data servers 72 corresponding to the country, state or federal state 11, 12 the road finishing machine 20 is located. Furthermore the temperature measurement and monitoring system 50 and in particular the control unit 53 can transmit temperature data, generated reports or other data and information belonging to the paving process to the one or more data servers 72.

It is also possible that a communication between the road finishing machine 20, in particular between the temperature measurement and monitoring system 50, and a mobile device 90 can be set up. To transfer and exchange data between the temperature measurement and monitoring system 50 and the mobile device 90, the control unit 53 is able to set up and enable a communication link 84 to mobile device 90 via the wireless communication interface unit 55 and via a communication unit 95 of the mobile device 90, for example via a GSM network, Bluetooth, WLAN or another kind of known wireless communication technology. The temperature measurement and monitoring system 50 and in particular the control unit 53 can transmit temperature data, generated reports or other data and information belonging to the paving process to the mobile device 90 so that an operator or supervisor nearby the road finishing machine 20 can, for example, monitor the temperature of the newly laid paving mat 32. The mobile device 90 can be a laptop computer 91, a smartphone 92 or any other kind of mobile or portable device 93. The mobile device 90 is furthermore able to set up and enable a communication link 86, 82 to the one or more data servers 72 via communication unit 95 and via the network 70, for example via a GSM network or an internet connection, in order to transmit or to download data.

FIGS. 3a to 3c show an exemplary structure of a computer-readable specification file 100 which contains all relevant data, information and requirements for the temperature measurement and monitoring system 50. As described above, different temperature specifications are available, depending on the country or state the road finishing machine 20 is used. For example, the content of a post processing report bases on national or state-specific (country-specific) specifications and include, for example, various calculations of average temperatures or different statistical data. In practice each state has slightly different requirements, penalties and rewards, and reports (for example Minnesota 12 or Texas 11 in the US). It is conceivable that adjacent states will have different specifications. Currently all the specifications are stored within the control unit 53 or the operating and monitoring unit 52 of the temperature measurement and monitoring system 50 and an operator manually selects the correct specification for the post processing report.

The specification file 100 of FIGS. 3a to 3c is divided into different areas 110 to 190. The areas 110 and 120 (see A and B) include settings regarding the temperature measuring device 51, in detail settings depending on the apparatus type (see A 1 and B 1) "Handheld Camera" or "Paver-mounted", whereby the paver-mounted version is in this example a temperature scanner (movable infrared temperature sensor) and the handheld camera is a handheld non-contact infrared thermometer or a thermal imaging camera. Besides there are common and same settings for both given apparatus types, for example the measuring range (see A 2.1, A 2.2, B 3.1 and B 3.2), some settings differ between the both apparatus types, for example the absolute and relative accuracy (see A 3.1, A 3.2, B 4.1 and B 4.2).

Furthermore there are a lot of different and apparatus type depending settings, for example the image resolution (see A 4) or the maximum transverse spacing (see B 2).

Area 130 (see C) show common and basic settings for the temperature measurement and monitoring system 50, independent what kind of apparatus type is installed on the road finishing machine 20. Examples are the units of degrees (see C 1), which is set to Fahrenheit, or the maximum paver stop time (see C 2), which is set to 60 seconds. The maximum paver stop time is relevant when performing a thermal profile of the newly laid pavement layer 32 and the road finishing machine 20 stops for more than 60 seconds (or other stop time value given in C 2). Then, a defined area behind the screed 25 and in front of the screed 25 (in the direction of travel of the road finishing machine 20) may be excluded from the thermal profile.

The areas 140 and 150 (see D and E) include measuring procedures, depending on the apparatus type (see D 1 and E 1) "Handheld Camera" or "Paver-mounted". The areas 140 and 150 include in detail display advices, which will be shown to the operator via the display of the operating and monitoring unit 52. By pressing a button or the like, the operator can confirm that he has read the instructions and advices carefully.

The areas 160 and 170 (see F and G) include calculation details which may be used to calculate the temperature differential of the uncompacted newly laid pavement mat surface 32. The calculations depend also on the apparatus type (see F 1 and G 1).

Furthermore, area 180 (see H) includes details for the post processing report and of its form. In particular area 180 includes the report file to be used, for example an Excel-Sheet "ABC123.xls" (see H1). Additional areas 190 within the specification 100 are possible; this depends basically on national or state-specific requirements.

Figure 4B:
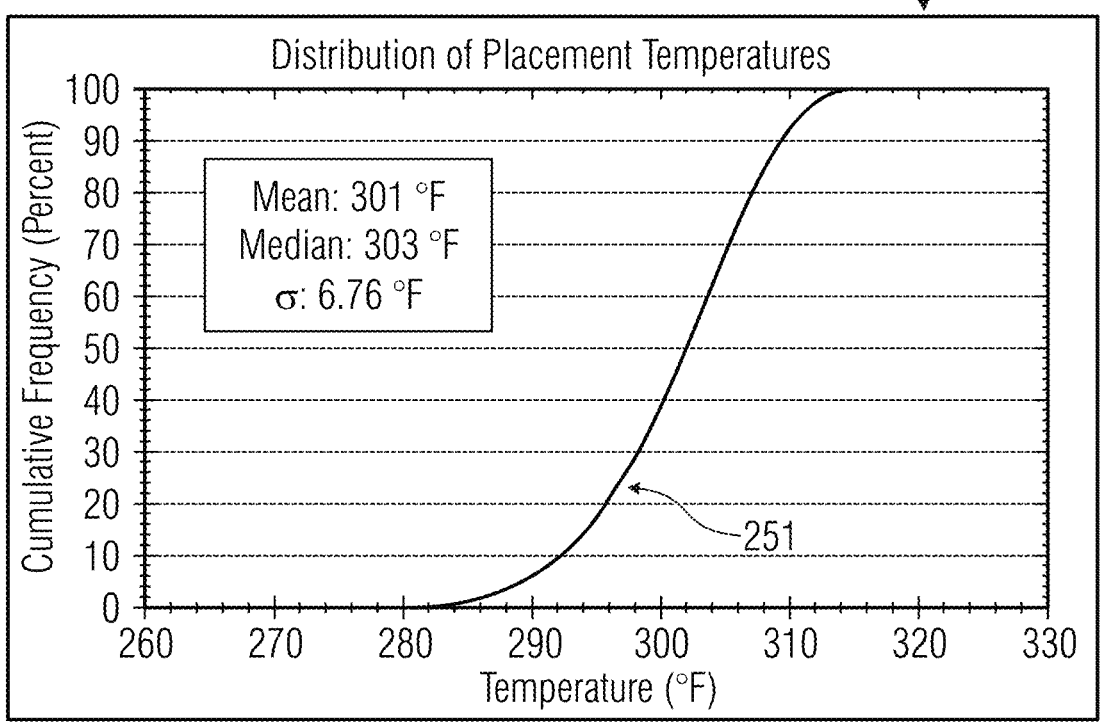

FIGS. 4a and 4b show an exemplary structure of a report file 100, generated in post-process. The report file 200 is named as a "Thermal Profile Summary Report" and contains all relevant data regarding determined temperature measurements during the paving process.

The report file 200 of FIGS. 4a and 4b is divided into different areas 210 to 250. The area 210 includes basic information about the jobsite, project, and material and so on. Area 220 of the report file 200 gives an overview of the number of profiles taken by the temperature measurement and monitoring system 50 during the paving process, and shows how much of the taken profiles are moderate (a differential temperature is more than 25° F. and below 50° F.) or severe (a differential temperature is more than 50° F.). In the example, 67 profiles were taken, 5 of them (7 percent) are moderate and none are severe.

The following area 230 refers to the information of area 220 and gives more details about the moderate and severe profiles. As described above, 5 of the profiles are moderate, and area 230 lists these 5 profiles together with position information, minimum and maximum measured temperature values and the calculated temperature differential. For example, the first profile number 1 starts at location 2906.93 (GPS-Position: 87.864719 W, 44.37617900 N) and ends at location 2908.43 (GPS-Position: 87.864998 W, 44.37657300 N). The maximum measured temperature value is 322.2° F., the minimum measured temperature value is 286.2° F., which results in a calculated temperature differential of 36° F. In contrast to the area 230, the following area 240 gives a summary of locations without thermal segregation and lists all other profiles, which are not listed within the area 230, together with position information, minimum and maximum measured temperature values and the calculated temperature differentials. For example, the first profile without thermal segregation is number 2 and starts at location 2908.44 (GPS-Position: 87.865 W, 44.37657600 N) and ends at location 2909.92 (GPS-Position: 87.865277 W, 44.37696500 N). The maximum measured temperature value of this profile is 308.7° F., the minimum measured temperature value is 290.8° F., which results in a calculated temperature differential of 17.8° F. Within the graphic "Distribution of Placement Temperatures" of area 250, the curve 251 shows the distribution of the temperatures used are after removing 1% of the lowest and 1.5% of the highest temperatures. Furthermore, the three values (Mean, Median and σ) within the graphic have the following meaning:

Mean (Average): The sum of all data entries divided by the number of entries. When outliers are present it is best to use the median as the measure of central tendency. The standard deviation measure variability and consistency of the sample or population.

Example for Mean or (Average):

(250° F.+283° F.+275° F.+265° F.+270° F.+200° F.)/
6=257.166° F.

Median is if there are an even number of events. Within the graphic "Distribution of Placement Temperatures" of area 250, the average of the two middle samples are used to calculate the Median:

200° F.+250° F.+265° F.+270° F.+275° F.+283°
F.→Median: 265° F.+270° F./2=267

This calculation is to remove influence from any outlier. As seen, the outlier of 200° F. above skewed the average to the low side and the calculation outcome below is more compatible with the norm.

Standard Deviation σ is best described as an average deviation from the average of a data set. It will be described by an example below with different values.

First step is to find the Mean:

Mean=(600° F.+470° F.+170° F.+430° F.+300° F.)/
5=1970° F./5→Mean=394° F.

Second step is to calculate the Variance (take the difference of each data point to the mean or average, square it, and then average the result):

Variance σ²=(42436+5776+50176+1296+8836)/
5=108520/5

Variance σ²=21704

The calculated Variance σ² of the example is 21704.

Third step is to calculate the Standard Deviation σ, which is just the square root of the Variance: Standard Deviation σ=√21704=147.32 . . . ≈147

The temperature measurement specifications discussed with respect to FIG. 3a-3c are for illustration purposes so the temperature measurement specification may be defined with regard to different parameters. Analogously, the parameters for the temperature measurement report may vary. Consequently, according to embodiments, the temperature measurement specification may comprise at least one or two parameters as discussed above. Analogously, the temperature measurement report specification may define at least one or two parameters as discussed with respect to FIGS. 4a and 4b.

In an advantageous manner, the content of the report 200 can be encrypted and is not changeable. Furthermore, additional areas within the report 200 are possible; this depends basically on national or state-specific requirements.

Although in above embodiments the selection of the specification data set has been described as being based on a position information received from a position sensor so as to enable an automatically selection, it should be noted that the section may also be based on a position information which was manually selected, e.g. by an operator via a terminal (e.g. user interface belonging to the control unit or an operation/monitoring system of the road construction machine). So, according to embodiments, the position information and then the specification may be pulled based on feedback from the operator. This feedback being the operator selecting a state/country from a map or from a pull-down menu.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A control unit of a temperature measurement system for a road construction machine;
wherein the control unit is able to access a database, a plurality of specification data sets stored on said database, wherein each of the plurality of specification data sets is assigned to a local region and comprises a temperature measurement specification and/or a temperature measurement report specification;
the control unit comprises a data set selector, which is configured to select a respective specification data set out of a plurality based on a position information for the road construction machine, the position information pointing to the respective local region; and
a data analyzer, which is connected to a temperature sensor and configured to analyze raw data received from the temperature sensor taking into account the selected temperature measurement specification and/or to output a local specific temperature report based on the analyzed raw data taking into account the selected temperature measurement report specification.

2. The control system according to claim 1, wherein the data analyzer is configured to perform a temperature calculation applied to the raw data, wherein the temperature calculation depends on the selected temperature measurement report specification to acquire the local specific temperature report and/or
wherein the data analyzer is configured to calculate a temperature median value, wherein the calculation of the temperature median value is defined within the selected temperature measurement report specification so as to acquire local specifically calculated median temperatures for the local specific temperature report.

3. The control system according to claim 1, wherein the control unit controls the data analyzer and/or temperature sensor and/or outputs information to the operator so as to apply local specific measurement procedures defined by the selected temperature measurement specification.

4. The control unit according to claim 1, wherein the data analyzer is configured to output the local specific temperature report, wherein the local specific temperature report comprises a local specific content defined by the selected temperature measurement report specification and/or comprises a local specific form defined by the selected temperature measurement report specification.

5. The control unit according to claim 1, wherein the data analyzer is configured to take into account local specific temperature requirements which are defined within the selected temperature measurement specification.

6. The control unit according to claim 1, wherein the control unit is connected to or comprises a position sensor configured to output the position information.

7. The control unit according to claim 1, wherein the control unit comprises a memory having stored thereon the database.

8. The control unit according to claim 1, comprising a measurement memory, wherein the data analyzer is configured to store the raw data and/or the local specific temperature report into the measurement memory; or
comprising a measurement memory, wherein the data analyzer is configured to store the raw data and/or the local specific temperature report together with the respective position information.

9. The control unit according to claim 1, wherein the control unit is connected to a further sensor, and/or a weather sensor, wherein the data analyzer is configured to use the measurements from the further sensor and/or the weather sensor for its analysis in accordance with the selected temperature measurement specification.

10. The control unit according to claim 1, wherein the respective specification data set out of the plurality comprises an information regarding temperature measurement device settings, regarding allowed temperature device settings, regarding basic settings, regarding a measurement procedure, regarding a measurement procedure dependent on the temperature measurement device, regarding a calculation, regarding a calculation dependent on the temperature measurement device, regarding a report content, and/or regarding a report form.

11. The control unit according to claim 1, wherein the control unit comprises a user interface for outputting information to an operator and/or is connected to an operation/monitoring system of the road construction machine in order to output information to the operator; and/or
   wherein the control unit comprises a user interface enabling the operator to manually select the position information and/or is connected to an operation/monitoring system of the road construction machine to enable the operator to manually select the position information.

12. The control unit according to claim 1, wherein the database is stored on a server so that the plurality of specification data sets can be updated; or wherein the control unit is configured to updated the database comprising the plurality of specification data sets.

13. The control unit according to claim 1, wherein the temperature measurement specification defines local specific temperature requirement and/or local specific measurement procedure and/or comprises information regarding temperature measurement device setting, wherein the temperature measurement report specification defines local specific form of the report.

14. A temperature measurement system comprising a control unit according to claim 1 and a temperature sensor or temperature scanner as temperature sensor or temperature camera as temperature sensor; or
   comprising a control unit according to claim 1, a position sensor and a temperature sensor or temperature scanner as temperature sensor or temperature camera as temperature sensor.

15. A road construction machine, especially a road paver, comprising
   a control unit according to claim 1 or
   a temperature measurement system comprising a control unit according to claim 1 and a temperature sensor or temperature scanner as temperature sensor or temperature camera as temperature sensor; or
   comprising a control unit according to claim 1, a position sensor and a temperature sensor or temperature scanner as temperature sensor or temperature camera as temperature sensor.

16. A method for operating a temperature measurement system for a road construction machine, comprising:
   getting access to a database, a plurality of specification data sets stored on said database, wherein each of the plurality of specification data sets is assigned to a local region and comprises a temperature measurement specification and/or a temperature measurement report specification;
   selecting a respective specification data set out of a plurality based on a position information for the road construction machine, the position information pointing to the respective local region;
   receiving raw data from a temperature sensor; and
   analyzing the raw data taking into account the selected temperature measurement specification and/or outputting a local specific temperature report based on the analyzed raw data taking into account the selected temperature measurement report specification.

17. A non-transitory digital storage medium having a computer program stored thereon to perform the method for operating a temperature measurement system for a road construction machine, comprising:
   getting access to a database, a plurality of specification data sets stored on said database, wherein each of the plurality of specification data sets is assigned to a local region and comprises a temperature measurement specification and/or a temperature measurement report specification;
   selecting a respective specification data set out of a plurality based on a position information for the road construction machine, the position information pointing to the respective local region;
   receiving raw data from a temperature sensor; and
   analyzing the raw data taking into account the selected temperature measurement specification and/or outputting a local specific temperature report based on the analyzed raw data taking into account the selected temperature measurement report specification;
when said computer program is run by a computer.

* * * * *